US012640835B2

(12) United States Patent
Khayrallah

(10) Patent No.: US 12,640,835 B2
(45) Date of Patent: May 26, 2026

(54) METHOD FOR MULTISITE TRANSMISSION USING COMPLEMENTARY CODES

(71) Applicant: Telefonaktiebolaget LM Ericsson (publ), Stockholm (SE)

(72) Inventor: Ali S. Khayrallah, Mountain View, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 18/249,735

(22) PCT Filed: Nov. 25, 2020

(86) PCT No.: PCT/IB2020/061109

§ 371 (c)(1),
(2) Date: Apr. 19, 2023

(87) PCT Pub. No.: WO2022/112822

PCT Pub. Date: Jun. 2, 2022

(65) Prior Publication Data

US 2023/0421287 A1     Dec. 28, 2023

(51) Int. Cl.
H04L 1/00 (2006.01)
(52) U.S. Cl.
CPC .......... H04L 1/0004 (2013.01); H04L 1/0041 (2013.01); H04L 1/0057 (2013.01); H04L 1/0068 (2013.01)
(58) Field of Classification Search
CPC ... H04L 1/0004; H04L 1/0041; H04L 1/0057; H04L 1/0068; H04L 25/03318; H04L 1/0003; H04L 2001/0092; H04L 1/06
See application file for complete search history.

(56) References Cited

U.S. PATENT DOCUMENTS

| | | | |
|---|---|---|---|
| 8,000,655 B2 | 8/2011 | Wang et al. | |
| 8,340,202 B2 | 12/2012 | Huss et al. | |
| 8,406,354 B2 | 3/2013 | Khayrallah et al. | |
| 2004/0097215 A1 * | 5/2004 | Abe | H04L 1/08 |
| | | | 370/335 |

(Continued)

FOREIGN PATENT DOCUMENTS

WO     WO-2010030211 A1 *  3/2010  ........... H04B 17/309

OTHER PUBLICATIONS

International Search Report and Written Opinion for Application No. PCT/IB2020/061109, Sep. 9, 2021, 20 pages.

(Continued)

*Primary Examiner* — Moo Jeong
*Assistant Examiner* — David Zhijun Sun
(74) *Attorney, Agent, or Firm* — Sonoda & Kobayashi Intellectual Property Law; Sarvajit S. Patil

(57) ABSTRACT

A method of a transmitter enables multi-site wireless transmission using complementary channel coding. The method includes receiving a message to be transmitted to a receiver, encoding the message as a first codeword using a shared mother code, parsing the first codeword into a first complementary codeword of a set of complementary codewords specific to the first codeword, determining a set of shared channel resources and a configuration of the transmitter to be utilized to transmit the first complementary codeword, and transmitting the first complementary codeword to the receiver.

10 Claims, 10 Drawing Sheets

(56) References Cited

U.S. PATENT DOCUMENTS

| | | | | |
|---|---|---|---|---|
| 2008/0070518 | A1 | 3/2008 | Shinozaki | |
| 2008/0084853 | A1* | 4/2008 | Kuchibhotla ..... | H04W 72/0446 |
| | | | | 438/257 |
| 2011/0128930 | A1* | 6/2011 | Furuskar .............. | H04L 1/0015 |
| | | | | 370/329 |
| 2013/0301758 | A1* | 11/2013 | Reial ................ | H04L 25/03286 |
| | | | | 375/340 |
| 2020/0228254 | A1* | 7/2020 | Ma ........................ | H04L 1/1819 |
| 2021/0314067 | A1* | 10/2021 | Inui ....................... | H04L 1/0016 |

OTHER PUBLICATIONS

Hochwald et al., "Achieving Near-Capacity on a Multiple-Antenna Channel", Mar. 2003, pp. 389-399, IEEE Transactions on Communications, vol. 51, No. 3.

Li et al., "Adaptive Cooperative Coding in Wireless Networks", May 11, 2008, pp. 569-573, VTC Spring 2008—IEEE Vehicular Technology Conference, IEEE.

Svensson et al., "Special Issue on Adaptive Modulation and Transmission in Wireless Systems", Dec. 6, 2007, pp. 2269-2273, vol. 95, No. 12, Proceedings of the IEEE, IEEE.

Invitation to Pay Additional Fees for Application No. PCT/IB2020/061109, Jul. 19, 2021, 13 pages.

* cited by examiner

ACQUIRE MESSAGE TO TRANSMIT TO A RECEIVER          201

ENCODE THE MESSAGE AS A FIRST CODEWORD
USING A SHARED MOTHER CODE          203

PARSE FIRST CODEWORD INTO A FIRST COMPLEMENTARY
CODEWORD OF A SET OF COMPLEMENTARY CODEWORDS          205

DETERMINE SHARED CHANNEL RESOURCES AND CONFIGURATION
TO BE USED BY TRANSMITTER          207

TRANSMIT THE FIRST COMPLEMENTARY CODEWORD TO
THE RECEIVER          209

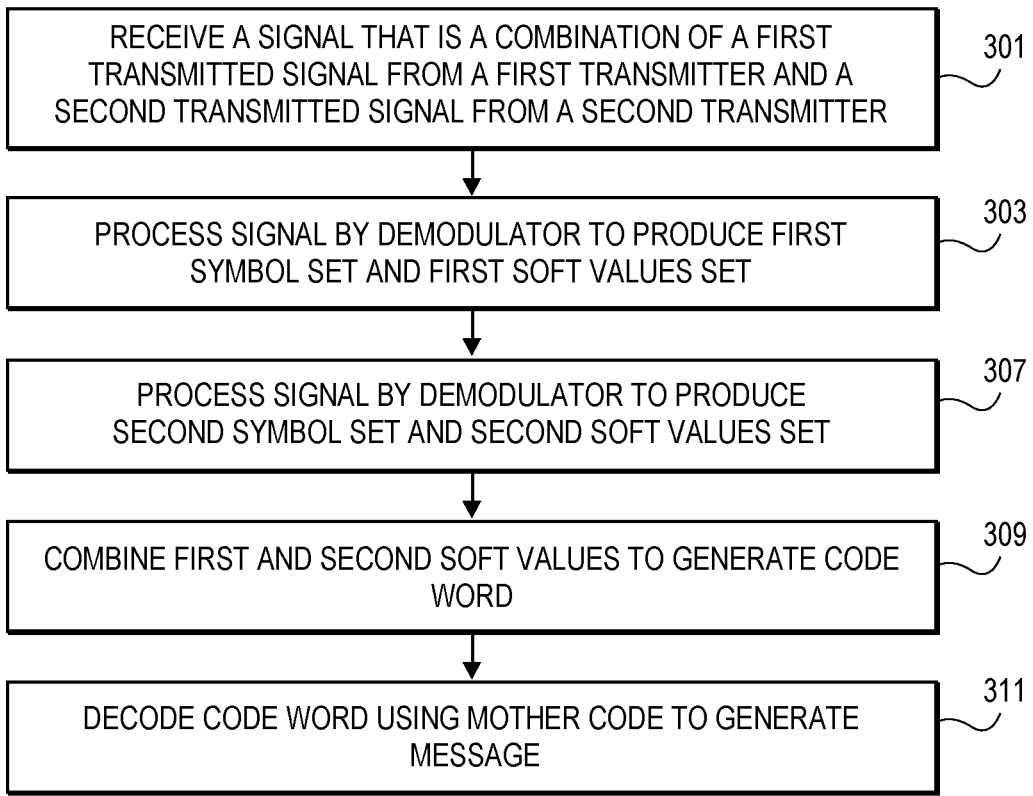

RECEIVE A SIGNAL THAT IS A COMBINATION OF A FIRST TRANSMITTED SIGNAL FROM A FIRST TRANSMITTER AND A SECOND TRANSMITTED SIGNAL FROM A SECOND TRANSMITTER — 301

PROCESS SIGNAL BY DEMODULATOR TO PRODUCE FIRST SYMBOL SET AND FIRST SOFT VALUES SET — 303

PROCESS SIGNAL BY DEMODULATOR TO PRODUCE SECOND SYMBOL SET AND SECOND SOFT VALUES SET — 307

COMBINE FIRST AND SECOND SOFT VALUES TO GENERATE CODE WORD — 309

DECODE CODE WORD USING MOTHER CODE TO GENERATE MESSAGE — 311

FIG. 3

METHOD FOR MULTISITE TRANSMISSION USING COMPLEMENTARY CODES

CROSS-REFERENCE TO RELATED APPLICATIONS

This application is a National stage of International Application No. PCT/IB2020/061109, filed Nov. 25, 2020, which is hereby incorporated by reference.

TECHNICAL FIELD

Embodiments of the invention relate to the field of mobile communications; and more specifically, to methods and systems for improving communication in mobile communication system.

BACKGROUND ART

Cellular or mobile communication networks (herein after referred to as 'mobile communication networks') are widely utilized communication networks that enable communication by user equipment (UE) via a wireless link with the remainder of the mobile communication network, other devices accessible via the mobile network, and other connected networks. Mobile communication networks are distributed over large geographical areas. The components of the mobile communication networks that interface with UE via the wireless communication are referred to as "cells," each cell including at least one fixed-location transceiver, but more normally, a set of transceivers referred to as a base transceiver station or base station. The base stations provide access to UEs within the cell to the mobile communication network, which can be used for transmission of voice, data, and other types of content. Mobile network operators (MNOs) develop and maintain the mobile communication networks and contract with subscribers to provide service to their respective UEs.

Mobile communication networks are based on evolving sets of technology to improve the quality of services and the throughput offered to UEs. An emerging technology is the $5^{th}$ Generation (5G) new radio (NR) technology as defined by the $3^{rd}$ generation partnership project (3GPP). The 5G mobile network includes a number of functions that can be distributed over any number and combination of electronic devices including the electronic devices of a base station, radio access network (RAN), and other devices in the 5G mobile network core. In a 5G mobile network, a UE can be connected to the 5G mobile network via the RAN including a next generation node basestation (gNodeB) and similar components of the RAN. The RAN can include any number of gNodeBs that service any number of UEs. Various functions can be distributed to partially or completely execute at gNodeBs or related components to reduce the latency between the functions and the UEs. Computing services at the gNodeB or related components can be managed as edge services or an edge cloud platform in conjunction with computing services elsewhere in the 5G mobile communication network.

SUMMARY

In one embodiment, a method of a transmitter enables multi-site wireless transmission using complementary channel coding. The method includes receiving a message to be transmitted to a receiver, encoding the message as a first codeword using a shared mother code, parsing the first codeword into a first complementary codeword of a set of complementary codewords specific to the first codeword, determining a set of shared channel resources and a configuration of the transmitter to be utilized to transmit the first complementary codeword, and transmitting the first complementary codeword to the receiver.

In another embodiment, an electronic device implements a method to enable multi-site wireless transmission using complementary channel coding. The electronic device includes an encoder to receive a message to be transmitted to a receiver, to encode the message as a first codeword using a shared mother code, to parse the first codeword into a first complementary codeword of a set of complementary codewords specific to the first codeword, and a transmitter coupled to the encoder, the transmitter to determine a set of shared channel resources and a configuration of the transmitter to be utilized to transmit the first complementary codeword, and to transmit the first complementary codeword to the receiver.

In a further embodiment, a method of a receiver enables multi-site wireless transmission using complementary channel coding. The method of the receiver includes receiving a signal that is a combination of a first transmitted signal from a first transmitter and a second transmitted signal from a second transmitter, processing the signal to produce a first symbol set and a first set of soft values corresponding to the first transmitted signal, processing the second signal to produce a second symbol set and a second set of soft values corresponding to the second transmitted signal, combining the first set of soft values and the second set of soft values to generate a codeword, and decoding the codeword with a mother code to generate a message.

In one embodiment, an electronic device implements the method to enable multi-site wireless transmission using complementary channel coding. The electronic device includes a receiver to receive a first signal from a first transmitter, and to process the first signal to produce a first symbol set and a first set of soft values, to receive a second signal from a second transmitter, and to process the second signal to produce a second symbol set and a second set of soft values, and a demodulator coupled to the receiver to combine the first set of soft values and the second set of soft values to generate a codeword, and to decode the codeword with a mother code to generate a message.

BRIEF DESCRIPTION OF THE DRAWINGS

The invention may best be understood by referring to the following description and accompanying drawings that are used to illustrate embodiments of the invention. In the drawings:

FIG. 3 is a flowchart of one embodiment of a process for a receiver to handle multi site transmission.

DETAILED DESCRIPTION

Figure 1:
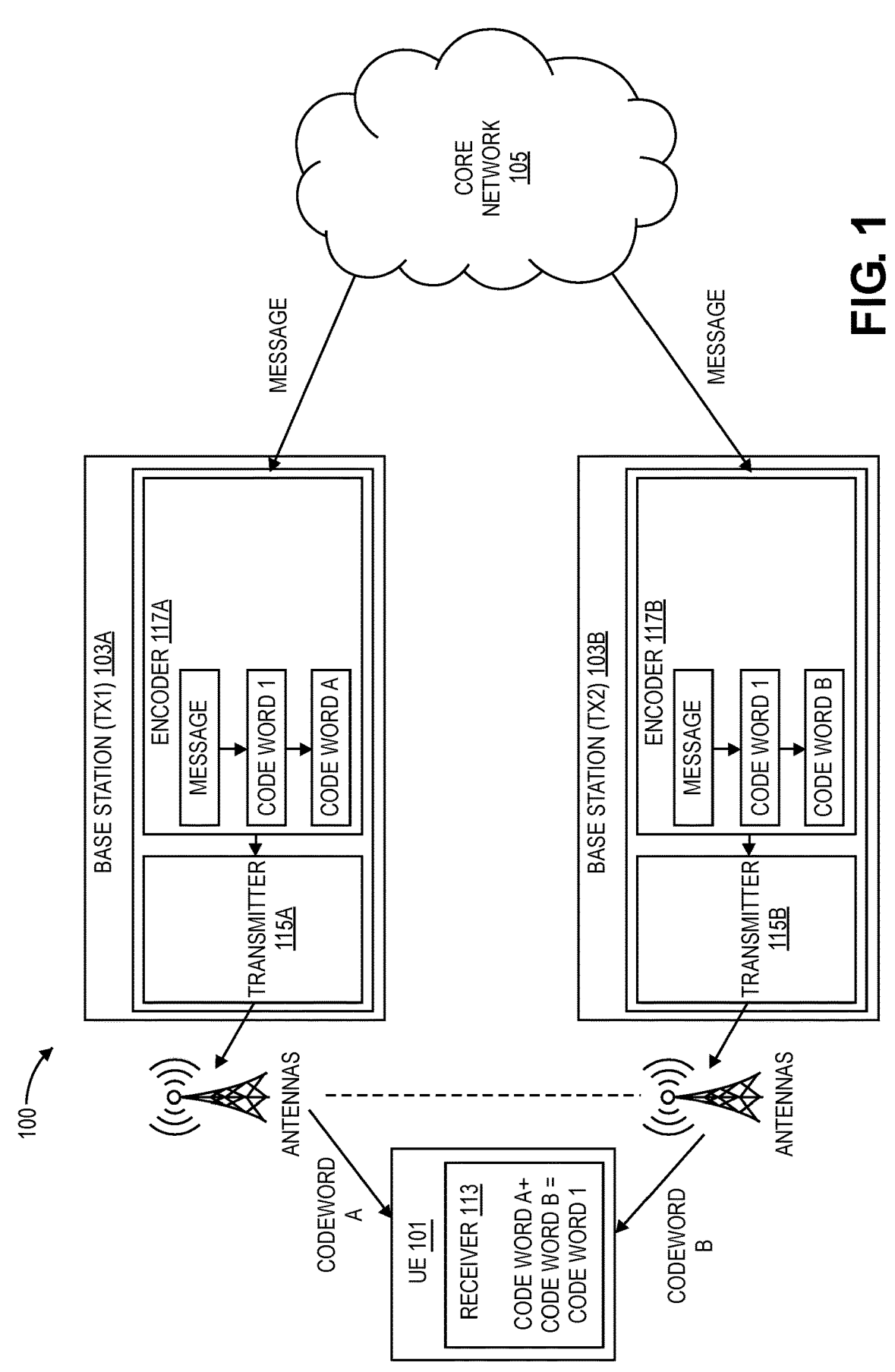
FIG. 1 is a diagram of one example mobile communication network that supports multisite transmission.

The following description describes methods and apparatus for multisite transmission in a mobile communication network. The embodiments provide a system and processes for enabling multiple sites (e.g., base stations or similar access points) to communicate simultaneously with a user equipment (UE) to improve the quality of the communication between the UE and the mobile communication network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (network (e.g., other network devices, end-user devices). Some network devices are "multiple services network devices" that provide support for multiple networking functions (e.g., routing, bridging, switching, Layer 2 aggregation, session border control, Quality of Service, and/or subscriber ND) is an electronic device that communicatively interconnects other electronic devices on the management), and/or provide support for multiple application services (e.g., data, voice, and video).

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other features and advantages of the enclosed embodiments will be apparent from the following description.

Developing and deploying processes and systems that are practical and support multisite transmission in mobile communication offers many advances in the field of mobile technology. The ability to transmit to a terminal (e.g., a UE) from multiple locations (e.g., base stations or similar access points) provides a very large potential boost in performance and robustness. At higher frequencies in particular, obstacles can severely degrade the received signal quality from a particular location. With multisite transmission the likelihood of the terminal receiver being well connected to at least one site is much improved over single site transmission.

There currently exist certain challenges in the field of mobile communication technology with relation to multisite transmission. The most advanced multisite transmission techniques attempt to transmit signals that add coherently at the receiver. This requires levels of coordination and synchronization that are prohibitively difficult to achieve in practice. As a result, the practical performance of these advanced techniques has been generally lacking.

Certain aspects of the present disclosure and their embodiments may provide solutions to these or other challenges. The embodiments address the problem of multisite transmission by relying on channel coding. In particular, the embodiments use complementary codewords representing the same information to form the signals transmitted simultaneously from different sites, and the embodiments rely on the receiver structure, and the decoder in particular, to capture the benefit of the multisite transmission. The requirements on coordination and synchronization between sites are much lower than other approaches making the process of the embodiment more practical and efficient. The transmission rates from multiple sites are set as a function of the terminal receiver structure and features, e.g. serial iteration or interference rejection. Thus, the embodiments make use of complementary transmissions from multiple sites based on complementary channel codes. The embodiments set the transmit parameters to balance the received signals at the terminal. Receiver techniques are used to accommodate the complementary transmissions, including parallel and serial multi-stage structures, with hard or soft signal reconstruction.

There are, proposed herein, various embodiments which address one or more of the issues disclosed herein. Certain embodiments may provide one or more of the following technical advantage(s). The embodiments unlock the reliability and robustness boost of multisite transmission without the extreme requirements on coordination and synchronization of other techniques.

FIG. 1 is a diagram of one example mobile communication network that supports multisite transmission. The example mobile communication network 100 is provided by way of example to illustrate the principles and techniques of the embodiments. In this illustrated example, the mobile communication network 100 includes a core network 105, a set of base stations 103A, B, and a user equipment (UE) 101. A 'set,' as used herein refers to any positive whole number of items, including one item.

The UE 101 can be any type of electronic device capable of wireless communication with the set of base stations 103A, B. The UE 101 can be a mobile device such as a smartphone or similar electronic device. The UE 101 can also be a fixed location devices such as a home personal computer, home/commercial networking device, or similar electronic device. The UE 101 includes a receiver 113 amongst other components, where the receiver 113 supports multisite transmission from the set of base stations 103A, B. The receiver 113 can receive radio frequency (RF) signals from the base stations 103A,B via arrays of associated antennas. These signals are detected and converted into digital values. In the embodiments, the receiver 113 receives complementary codewords from each of the base stations 103A, B that can be combined and decoded to generate a message that is transmitted via the multisite transmission process.

The base stations 103A, B are a set of electronic devices that manage the transmission of information from the base stations 103A, B via associated arrays of antennas to UEs (e.g., UE 101) that are serviced by the respective base stations 103A, B. The mobile communication network 100 can include any number, configuration, and geographical distribution of the set of base stations 103A, B to provide wireless communication services to a set of subscriber UEs (e.g., UE 101). The base stations 103A, B provide a range of functions and encompass a range of electronic devices that support communication between the set of UEs and the mobile communication network 100. The base stations 103A, B can also provide any range of computing resources to support functions of the mobile communication network 100 at the base stations 103A, B.

The base stations 103A, B can include components such as transmitters 115A, B, encoders 117A, B and similar components that enable multisite transmission. The transmitters 115A, B send wireless signals carrying information to the UEs via the associated antenna arrays. The information to be transmitted is encoded by a set of encoders 117A, B. The encoding by the encoders 117A, B generates a set of complementary codewords (i.e., codewords A, B, . . . ) that differ across each of the base stations 103A, B and are separately sent to the UE/receiver 101 where the complementary codewords are combined and decoded to recover the original message. Example processes for encoding the complementary codewords and decoding the complementary codewords are further described herein along with a definition for 'complementary.'

The core network 105 is a set of electronic device including networking devices that enable communication between the base stations 103A, B, services within the core network 105, and electronic devices in external networks. The core network 105 can implement a range of protocols to enable secured communication and the communication of information across the core network 105. The message to be transmitted to the UE 101 by the base stations 103A, B can be provided by the core network 105 to each base stations 103A, B from any source that is in communication with the core network 105.

Figure 2:
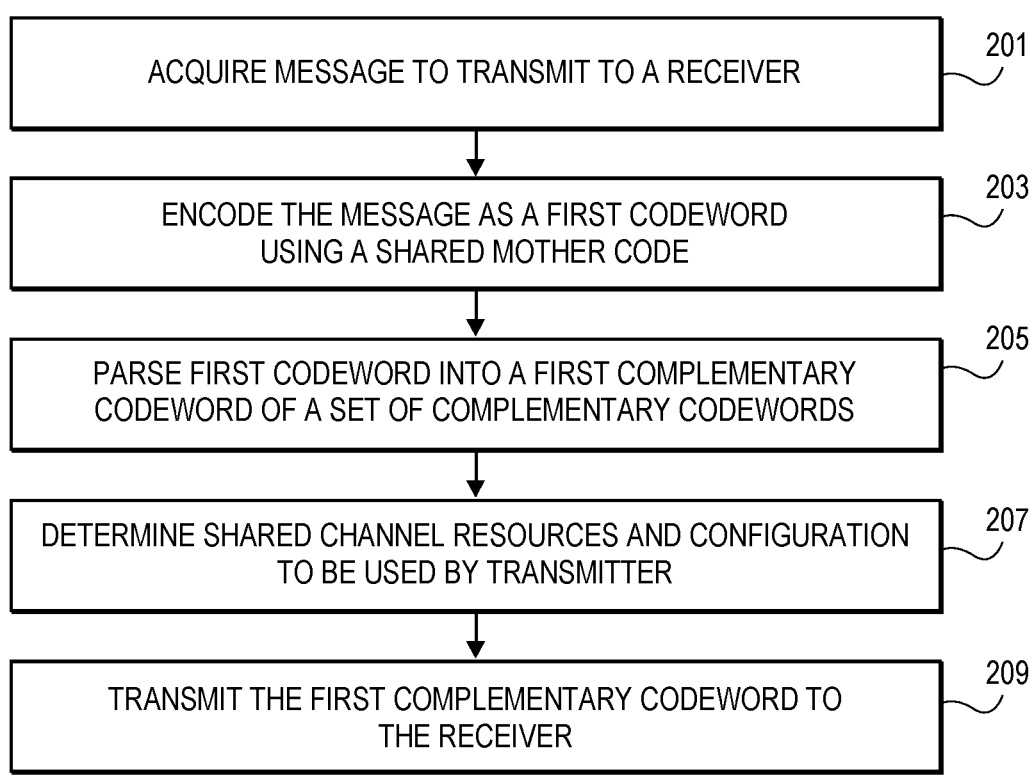
FIG. 2 is a flowchart of one embodiment of a process of a transmitter that supports multi site transmission.

FIG. 2 is a flowchart of one embodiment of a process of a transmitter that supports multisite transmission. Each transmitter that participates in the multisite transmission process can separately and independently implement a process such as that described in reference to FIG. 2 or an analogous process. The process as described with relation to FIG. 2 is a generalization of the process. Example implementations are discussed further herein.

The transmitter initiates the process of the multisite transmission responsive to acquiring a message to be sent to the receiver (Block 201). The acquired message can have any size, content, or format. The acquired message can be encoded into a first codeword (Block 203). Any encoder type, format, or process can be utilized. In some embodiments, the encoder uses a shared mother code such that all of the participating transmitters, which each separately acquire the same message will encode the message with the same result. A message can be 'acquired' by a transmitter by being received from other components of the base station, by being made available from high layers of the network, or by being made accessible or similarly provided to the transmitter.

The first codeword is parsed into a first complementary codeword of a set of complementary codewords (Block 205). The parsing process can be a puncturing or similar process that is configured such that each transmitter generates a different complementary codeword. The shared channel resources and configuration to be used by the transmitter is determined and/or established for the transmitter (Block 207). This configuration is selected to overlap with that of the other multisite transmitters such that the same channel resources are utilized to communicate with the receiver. With the configuration established, the first complementary codeword is sent to the receiver (Block 209).

FIG. 3 is a flowchart of one embodiment of a process for a receiver to handle multisite transmission. The receiver operates in response to receiving a signal that is a combination of a first transmitted signal from a first transmitter and a second transmitted signal from a second transmitter (Block 301). While an example of two transmitters is provided, those skilled in the art would appreciate that the process can be applied to any number of transmitters each sending a separate transmitted signal that is received as a combined signal. The 'combined' received signal is generated by each of the transmitters using a same set of shared channel resources and sending the respective transmission signals at approximately the same time or at a timing such that the respective signals arrive at the receiver at approximately the same time.

A demodulator at the receiver processes the received signal to produce a first symbol set and a first soft values set corresponding to the first transmitted signal (Block 303). At approximately the same time, the received signal is further processed by a second demodulator of the receiver to produce a second symbol set and a second set of soft values corresponding to the second transmitted signal (Block 307).

Once both the first signal and second signal have been demodulated and the respective soft values determined, then the soft values can be combined to form a codeword (Block 309). Any combination process can be utilized that mirrors the process used to generate the complementary codewords at the transmitters. The combined codeword is then decoded using the shared or mother code to generate the message from the transmitters (Block 311). This process can continuously decode sets of complementary codewords that are received from the transmitters to generate the corresponding original messages. This process is described with the example case of two transmitters, however, this process can scale to any number of transmitters each sending complementary codewords, such that each corresponding signal is separately demodulated at the receiver and transformed into the respective codeword. The set of codewords that are generated in this fashion are then combined to form the original message.

Thus, the embodiments have been described to utilize a complementary multisite transmission technique in a generalized manner at the transmitters (e.g., in relation to FIG. 2) and the receivers (e.g., in relation to FIG. 3). This technique is used for transmitting the same information from multiple sites to a single receiver or 'terminal.' A 'terminal' as used herein refers to a transceiver or similar device or component at one end of the multisite transmission such as a receiver of a UE 101.

The embodiments are further described by examples that use two transmission sites and a single terminal where the examples are provided by way of illustration and not limitation. One skilled in the art would appreciate that the processes and systems described herein can be scaled to service any number of transmission sites and terminals. In one example, transmitters 1 and 2 (TX1 and TX2) both have access to an information message x of K bits that is to be transmitted to the terminal, which can be represented as:

$$x=(x_1, \ldots ,x_K)$$

Without much loss of generality, the example embodiments can encompass x incorporating parity check bits, which can be used at the receiver to decide whether a codeword was received successfully. All transmitters (i.e., TX1 and TX2 in this example) can use the same channel encoder to produce an N bit codeword from a mother code (any mother code or shared encoding system can be used by the transmitters), such that the codeword y can be represented as:

$$y=(y_1, \ldots ,y_N)$$

The codeword can be parsed into 2 complementary codewords of lengths $N_1$ and $N_2$ respectively, where $N_1+N_2=N$:

$$y^{[1]} = \left(y_1^{[1]}, \ldots , y_{N_1}^{[1]}\right)$$

$$y^{[2]} = \left(y_1^{[2]}, \ldots , y_{N_2}^{[2]}\right)$$

As used in this example, "complementary" means that each code bit is assigned to either $y^{[1]}$ or $y^{[2]}$. More generally, "complementary" codewords are codewords whose bits are complementary parts of a larger codeword. Any method can be used to select $N_1$ and $N_2$, examples of which are discussed further herein. The elements of y are referred to herein as the coded bits. Any process or mechanism can be utilized to split y into $y^{[1]}$ and $y^{[2]}$. In one example embodiment, a puncturing pattern can be utilized that keeps $N_1$ out of N bits to produce $y^{[1]}$ from y, and let $y^{[2]}$ consist of the punctured $N_2$ bits. One skilled in the art would appreciate that the two component codewords may not be exactly complementary, e.g. $y^{[1]}$ and $y^{[2]}$, for example, both can include a few bits of y in common, or $y^{[1]}$ and $y^{[2]}$ can together not include all the bits of y.

The embodiments utilize a decoder for handling the complementary codes at the receiver. At the receiver, soft values are available for the coded bits. "Soft values" are values based on the analog signal received at the receiver and transformed into digital values. Let $z=(z_1, \ldots , z_N)$ denote the soft values corresponding to y. Similarly we define $z^{[1]}$ and $z^{[2]}$. Each soft value is a real number. By convention, here a positive soft value indicates the bit is equal to 0, and a negative soft value indicates a 1. A larger magnitude reflects a higher confidence. A zero magnitude indicates the absence of information.

In some of the receiver structures described herein, the whole vector z is available at the decoder input, in these cases the decoder of the mother code can be utilized. In some other cases, only $z^{[1]}$ or $z^{[2]}$ is available at the decoder. One approach is to use the same decoder, replacing the missing values with zero. That is if $z^{[2]}$ is missing, fill in its values in z with zeros. An equivalent approach is to use a dedicated decoder for the available complementary code. That is if $z^{[2]}$ is missing, then the process can use the dedicated code for $y^{[1]}$.

Apart from the decoding/encoding of the complementary codewords the rest of the TX1 and TX2 operation can be any established transmission process and related structures. This can involve radio access processes, techniques, and components, e.g. interleaving, higher order modulation, time, frequency, code division or OFDM, pilots, filtering, multi antenna transmission, and similar technologies. Only mention the relevant features needed to describe the embodiments improvements to multisite transmission are discussed herein for sake of clarity and conciseness. One skilled in the art would understand that the processes, features, functions, and structured discussed herein in relation to the embodiments of multisite transmission can be combined with any of the relevant technologies, functions, features, and components in art.

Both transmitters utilize the same M channel uses ("channel uses" are also referred to herein as "channel resources" and the terms are utilized interchangeably), so the received samples from each transmitter will completely overlap at the receiver. Channel uses may be in time, frequency, on an OFDM grid, or similar type of channel uses. In the example, at TX1, the $N_1$ code bits are mapped into a modulation constellation of size $2^{P_1}$, and split over $N_{TX1}$ streams and M channel uses, where $$M \times N_{TX1} \times P_1 = N_1$$

Similarly, the corresponding parameters at TX2 satisfy $$M \times N_{TX2} \times P_2 = N_2$$

If the parameters do not match perfectly, the process can make small adjustments with puncturing or repeating a few bits. Also, in some embodiments, the codewords can be blocked together before puncturing. The two equations above ties the transmit parameters together and are referred to herein as the M constraint.

Overall, at channel use i, $1 \le i \le M$, TX1 outputs $$s_i^{[1]} \text{ of size } N_{TX1} \times 1.$$

Similarly, TX2 outputs $$s_i^{[2]}$$

of size $N_{TX2} \times 1$. Similarly, $$S^{[1]} = \{s_i^{[1]}, 1 \le i \le M\}$$

and $$S^{[2]} = \{s_i^{[2]}, 1 \le i \le M\}$$

represent the same information x. Also let $E_1$ and $E_2$ denote the energy assigned to symbols at TX1 and TX2, respectively.

By default, the number of streams $N_{TX1}$ is assumed to be the same as the number of transmit antennas $N'_{TX1}$ out of TX1. In some cases or embodiments, $N'_{TX1}$ exceeds $N_{TX1}$, for instance in a transmit beamformer where multiple antennas are phased together to shape a signal in a certain direction. In such cases, the beamformer can be transparent to the receiver, which discerns only the $N_{TX1}$ streams. The same can hold for TX2 regarding $N_{TX2}$ and $N'_{TX2}$.

The terminal receiver has $N_{RX}$ antennas. At channel use i, $1 \le i \le M$, the channel from TX1 is represented by the matrix $$H_i^{[1]}$$

of size $N_{RX} \times N_{TX1}$. Similarly, the channel from TX2 is given by $$H_i^{[2]}$$

of size $N_{RX} \times N_{TX2}$. The received signal of size $N_{RX} \times 1$ is given by $$r_i = H_i^{[1]} s_i^{[1]} + H_i^{[2]} s_i^{[2]} + v_i$$

The noise vector $v_i$ of size $N_{RX} \times 1$ represents receiver noise and other unmodeled noise or interference sources. The covariance of the noise is denoted by $R_v$ of size $N_{RX} \times N_{RX}$, and this is assumed to remain the same over i. The channel matrices may vary over i. Without much loss of generality, it is assumed herein that $N_{RX} \ge N_{TX1}$ and $N_{RX} \ge N_{TX2}$. This is not a strong restriction since it addresses the number of streams as opposed to the number of antennas. This can make it possible to use linear receiver techniques in a straightforward way. Quantities such as channels and covariances may not be known in practice at the receiver, but can be estimated at the receiver using any technique or process for estimating these quantities. For sake of notation simplicity, the examples in the embodiments do not distinguish between exact and estimated quantities.

The receiver can have any structure and types of demodulators. Example embodiments of different receiver structures where the demodulator component tries to handle the signal from one transmitter while accounting for the effects of the other transmitter are presented herein. In one embodiment, the demodulator can be implemented as a sphere decoder (SD). Other demodulator approaches may be adapted to this problem as well.

In this example, for the purpose of demodulating the transmitted signal from TX1, the received signal from can be expressed as:

$$r_i = H_i^{[1]} s_i^{[1]} + w_i^{[2]}$$

where $$w_i^{[2]} = H_i^{[2]} s_i^{[2]} + v_i$$

lumps the noise with the signal from TX2, which acts as interference to the signal from TX1. The SD treats $$w_i^{[2]}$$

as the effective noise. Under the assumptions of independence between transmitted signals and noise, the covariance of $$w_i^{[2]}$$

is given by $$R_w^{[2]} = E^{[2]} H_i^{[2]} H_i^{[2]^H} + R_v$$

of size $N_{RX} \times N_{RX}$.

The SD transforms the demodulation problem into the "transmit domain" via the operation $$F^{[1]} = \left( H_i^{[1]^H} R_w^{[2]-1} H_i^{[1]} \right)^{-1} H_i^{[1]^H} R_w^{[2]-1}$$

of size $N_{TX1} \times N_{RX}$. This transforms the representation of the signal into a transmit domain by using a matrix transformation that represents a left inverse of a channel from the transmitter, which incorporates the channel from the transmitter and a noise covariance including an effect of a second transmitted signal.

It can be checked that $$F^{[1]} H_i^{[1]} = I.$$

The process transforms the received signal into the transmit domain $$\tilde{s}_i^{[1]} = F^{[1]} r_i$$

of size $N_{TX1} \times 1$.

This can be expressed $$\tilde{s}_i^{[1]} = s_i^{[1]} + u_i^{[2]}$$

where $$u_i^{[2]} = F^{[1]} w_i^{[2]}$$

is now the effective noise with covariance $$R_u^{[2]} = F^{[1]} R_w^{[2]} F^{[1]^H}$$

Given $$\tilde{s}_i^{[1]},$$

the SD finds the best candidate symbol vector using a metric given by $$n(\check{s}) = \left( \tilde{s}_i^{[1]} - \check{s} \right)^H R_u^{[2]-1} \left( \tilde{s}_i^{[1]} - \check{s} \right)$$

In this case, š is a vector of size $N_{TX1} \times 1$ of symbols from the modulation constellation of size $2^{P_1}$. The best candidate is denoted $$\hat{s}_i^{[1]}$$

and represents the SD's best guess about $$s_i^{[1]}.$$

The SD finds the best candidate using a constrained search within a progressively shrinking sphere. This constrained search and other details make the SD a very effective demodulation method, however, other types of demodulation methods can also be utilized.

In addition to the modulation symbols, the SD also produces soft values $z^{[1]}$, as defined earlier.

Figures 4, 5:
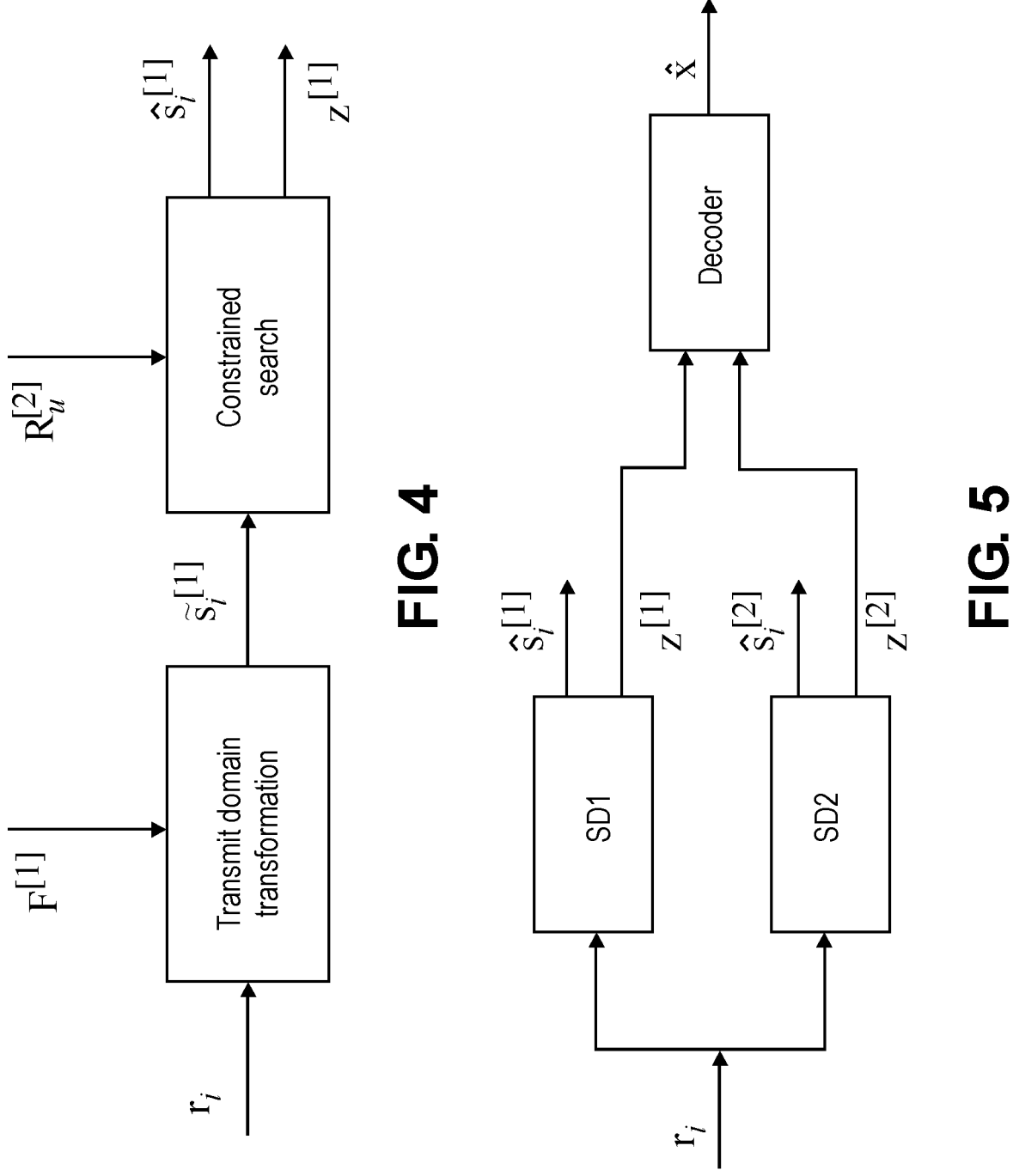
FIG. 4 is a diagram of one embodiment of a sphere decoder.
FIG. 5 is a diagram of one example embodiment of a parallel single stage receiver.

FIG. 4 is a diagram of one embodiment of a sphere decoder. The diagram illustrates the whole SD operation from applying the transmit domain transform to the received signal to producing symbols and coded soft values as SD1 as set forth above. Note that by accounting for the noise covariance via $$R_w^{[2]},$$

the SD of FIG. 4 is effectively suppressing interference represented by $$R_w^{[2]}.$$

In a simplified form of the SD, instead of $$R_w^{[2]}$$

a diagonal matrix matching the diagonal of $$R_w^{[2]}$$

is used. In this case, the absence of the off-diagonal information means that there is no interference suppression. In a further simplification, the diagonal elements can be replaced by their average value. Then the receiver becomes equivalent to a baseline maximum ratio combining (MRC) receiver.

A SD for handling the signals from other transmitters, e.g., TX2, can be similar to or identical to that described in relation to handling TX1 signals. Thus, generalized the receiver is demodulating the signal from TX2 from the received signal $r_i$. All the steps are the same as handling the first signal, with labels [1] replaced with labels [2] and vice versa. For example, the received signal can be expressed as $$r_i = H_i^{[2]} s_i^{[2]} + w_i^{[1]}$$

where the noise term is now $$w_i^{[1]} = H_i^{[1]} s_i^{[1]} + v_i$$

Also, the output soft values $$z^{[2]} = \left( z_1^{[2]}, \ldots, z_{N_2}^{[2]} \right)$$

correspond to the coded bits $y^{[2]} =$ $$\left( y_1^{[2]}, \ldots, y_{N_2}^{[2]} \right).$$

Thus, the process of the second decoder in this is example is sphere decoder 2 (SD2).

FIG. 5 is a diagram of one example embodiment of a parallel single stage receiver. In this example embodiment, the receiver includes SD1 and SD2, which are put together as a parallel single stage receiver. In this example, there is a received signal $r_i$ at index i input to SD1 with output symbols $$\hat{s}_i^{[1]}$$

and soft values $z^{[1]}$, and the same signal is input to SD2 with output symbols $$\hat{s}_i^{[2]},$$

and soft values $z^{[2]}$. There is a decoder with inputs $z^{[1]}$ and $z^{[2]}$ and output information bits $\hat{x}$. The soft values $z^{[1]}$ and $z^{[2]}$ are reorganized as $z=(z_1, \ldots, z_N)$ corresponding to the original codeword $y=(y_1, \ldots, y_N)$. Then z can be provided the decoder of the mother code to produce the output $\hat{x}=(\hat{x}_1, \ldots, \hat{x}_K)$ corresponding to the information message x.

The embodiments can encompass processes for setting the parameters at TX1 and TX2 so that the receiver performs well. The transmission parameters available to be optimized include K, N, $N_1$, $P_1$, $N_{TX1}$, $E_1$, $N_2$, $P_2$, $N_{TX2}$, and $E_2$, as discussed herein. These parameters are already linked together by the M constraint. Also, many of the transmission parameters are also guided by settings not directly to the embodiments. For instance $N_{TX1}$ depends on the rank of the channel $$H_i^{[1]}.$$

Also, $E_1$ is limited by the transmitter capabilities and depends on the choice of modulation which is reflected in $P_1$. Higher order modulation schemes such as 16QAM create a known pattern of variation in quality among coded bits, which depends on the placement of modulation symbols and the mapping from coded bits to symbols. This variation occurs around an average quality, and the embodiments are focused on the latter.

In embodiments that utilize coding techniques such as turbo and LDPC codes, these techniques perform best when their decoder input is of the same quality. Here the decoder input z consists of the soft value vectors $z^{[1]}$ and $z^{[2]}$. In some embodiments, a goal can be set to make the vectors of the same quality. While this arrangement suits the decoder best, one skilled in the art would appreciate that the decoder will still do its job even if the quality differs. The decoder can handle the variation due higher modulation mentioned earlier. Thus, the embodiments can balance the granularity and frequency of the adjustments with any performance loss.

The receiver estimates the channel quantities $$H_i^{[1]}, H_i^{[2]}$$

and $R_v$. The transmitters do not have direct knowledge of these estimates, but the receiver may send them feedback messages which summarize the estimates to help the transmitters choose their transmitter parameters. Also, the receiver may directly send a suggested set of transmission parameters based on the estimates.

The embodiments can also manage a coded bit error rate. In some embodiments, an approach is utilized to require the same coded bit error rate (CBER) over $y^{[1]}$ and $y^{[2]}$. To do so, the receiver may consider a codeword that is deemed to be received successfully, by checking the parity bits for instance. Then it may reconstruct the codeword bits $\hat{y}^{[1]r}$ by re-encoding $\hat{x}$, Then $\hat{y}^{[1]r}$ can be compared to $z^{[1]}$ which is obtained by making hard decisions on the soft bits of $z^{[1]}$, and count the coded bit errors. That count divided by $N_1$ can be denoted as $C_1$, which stands for an estimate of the CBER from TX1. Similarly the process of the embodiments can reconstruct $\hat{y}^{[2]r}$, count the bit errors by comparing to $\hat{z}^{[2]}$, and divide by $N_2$ to obtain $C_2$.

In some embodiments, a further smoothing of $C_1$ and $C_2$ can be done over multiple codewords. Finally, $C_1$ and $C_2$ are compared and the transmit parameters can be adjusted accordingly via feedback from the receiver. In situations where the system has a certain target CBER, then $C_1$ and $C_2$ may also be adjusted to that target. The superscript r in $\hat{y}^{[1]r}$ and $\hat{y}^{[2]r}$ is to explicitly indicate the reconstruction after the decoder. This designation is used herein in reference to multi-stage receivers.

The embodiments include various approaches to handling the soft values, in particular the soft value magnitudes. In one embodiment, an approach is used where the magnitude of the soft values serves as a quality indicator. As discussed herein above, a soft value is expressed by a real number. A positive soft value indicates the bit is equal to 0, and a negative soft value indicates a 1. A larger magnitude reflects a higher confidence. Furthermore, the average of the soft value magnitudes in $z^{[1]}$ can be used as a quality indicator for the bits in $y^{[1]}$ $$C_1 = \frac{1}{N_1} \sum_{j=1}^{N_1} \left| z_j^{[1]} \right|$$

Similarly, $$C_2 = \frac{1}{N_2} \sum_{j=1}^{N_2} \left| z_j^{[2]} \right|$$

As in other embodiments, $C_1$ and $C_2$ can be smoothed over multiple codewords. Finally, $C_1$ and $C_2$ are compared and the transmit parameters can be adjusted accordingly via feedback from the receiver.

In the embodiments, signal to noise ratio (SNR) can be incorporated as part of soft value quality. SNR can be a good proxy for soft value quality where the quality of the corresponding demodulated symbols are taken into account. That is, for SD1 the process can look at the error of the best candidate $$\hat{s}_i^{[1]}$$

where $$e(\hat{s}_i^{[1]}) \left( r_i - H_i^{[1]} \hat{s}_i^{[1]} \right)^H R_u^{[2]-1} \left( r_i - H_i^{[1]} \hat{s}_i^{[1]} \right)$$

The process can further average $$e(\hat{s}_i^{[1]})$$

over the M channel uses to obtain $$\bar{e}^{[1]} = \frac{1}{M} \sum_{i=1}^{M} e(\hat{s}_i^{[1]})$$

Also $$s_i^{[1]}$$

consists of $N_{TX1}$ symbols with energy $E^{[1]}$ and each corresponds to $P_1$ bits. This can be normalized accordingly to obtain a quality measure for the soft values of SD1 in the form of a signal to noise ratio (SNR), $$C_1 = \frac{\frac{E^{[1]}}{P_1}}{\frac{\bar{e}^{[1]}}{N_{TX1}}}$$

By going through the same steps for SD2, it is possible to obtain a SNR for the soft values of SD2

$$C_2 = \frac{\frac{E^{[2]}}{P_2}}{\frac{\bar{e}^{[2]}}{N_{TX2}}}$$

As in other cases, $C_1$ and $C_2$ can be further smoothed over multiple codewords. Finally, $C_1$ and $C_2$ are compared and the transmit parameters can be adjusted accordingly via feedback from the receiver. Other direct or indirect methods for received signal quality may be adapted for adjusting transmission parameters.

In addition to the single stage receiver embodiments described herein above, the embodiments further includes multi-stage receivers. The parallel single stage receiver may be extended to receivers with multiple stages which progressively improve performance. Receivers can have either a parallel structure or a serial structure. Both types of structures use the decoder to merge information from TX1 and TX2. The structures using hard signal reconstruction are described first, then soft signal reconstruction structures are described.

Structures that utilize hard signal reconstruction operate on the decoded message $\hat{x}$ and can reconstruct estimates of the two transmitted signals as seen at the receiver. These in turn will be subtracted from the total received signal $r_i$ as part of a parallel or serial multi-stage structure.

In these embodiments, $\hat{x}^{[1]}$ is provided to the encoder to produce a reconstructed codeword $\hat{y}^{[1]r}$, as discussed herein above. Next $\hat{y}^{[1]r}$ is input to the modulator of TX1 to produce reconstructed symbols $$\hat{s}_i^{[1]r}, 1 \leq i \leq M.$$

Finally $$\hat{s}_i^{[1]r}$$

is input into the channel $$H_i^{[1]}$$

to produce the reconstructed received signal from TX1

$$\hat{r}_i^{[1]r} = H_i^{[1]} \hat{s}_i^{[1]r}$$

This is process is FIG. 6, and is referred to as hard reconstruction, to distinguish it from soft reconstruction which is discussed herein below. Similarly, it is possible to produce $$\hat{r}_i^{[2]r}$$

from $\hat{x}^{[2]}$.

Figures 6, 7:
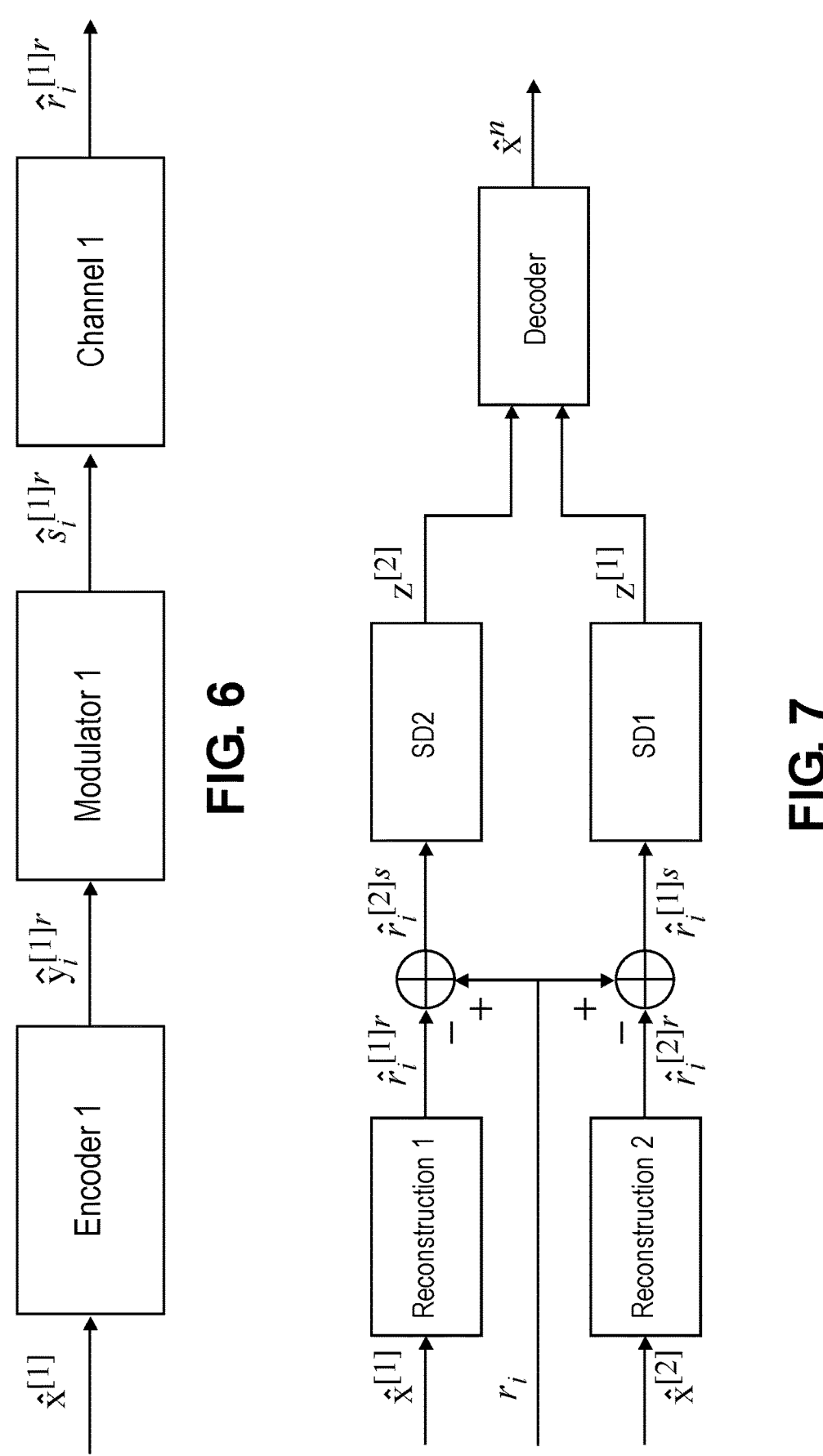
FIG. 6 is a diagram illustrating hard signal reconstruction.
FIG. 7 is a diagram of one example embodiment of multi-stage receiver.

FIG. 7 is a diagram of one example embodiment of multi-stage receiver. A single stage of the structure is illustrated. In some embodiments, the receiver includes structures that utilize a parallel stage. This parallel stage is a direct extension of the single stage receiver described herein above, which can be treated as the first stage. In the second stage, the first stage output $\hat{x}^{[1]}$ is used to produce $$\hat{r}_i^{[1]r},$$

which is subtracted from the received signal $r_i$ to produce the residual signal $$\hat{r}_i^{[2]s} = r_i - \hat{r}_i^{[1]r}$$

Under normal operation $$\hat{r}_i^{[2]s}$$

has most of the effect of the signal from TX1 removed. As a result, its covariance estimate is $R_v$ instead of $$R_w^{[2]}.$$

In this example of FIG. 7, $$\hat{r}_i^{[2]s}$$

is used as an input to SD2, using $R_v$, to produce a new soft value vector $z^{[2]}$. The same steps are followed as in other embodiments, starting from $\hat{x}^{[2]}$ to produce a new $z^{[1]}$. Finally $z^{[1]}$ and $z^{[2]}$ are fed to the decoder to produce a new output $\hat{x}^n$, where the subscript n highlights that this is the new estimate of the message x Subsequent stages follow in the same manner. That is, the output $\hat{x}^n$ from stage 2 becomes the input $\hat{x}$ for stage 3, which produces a new output $\hat{x}^n$, and the process similarly follows the other embodiments. The stopping criterion can be that the parity bits of $\hat{x}^n$ check successfully, or that the solution does not change from stage to stage. Other criteria of multi-stage structures may be adapted as well.

Figures 8, 9:
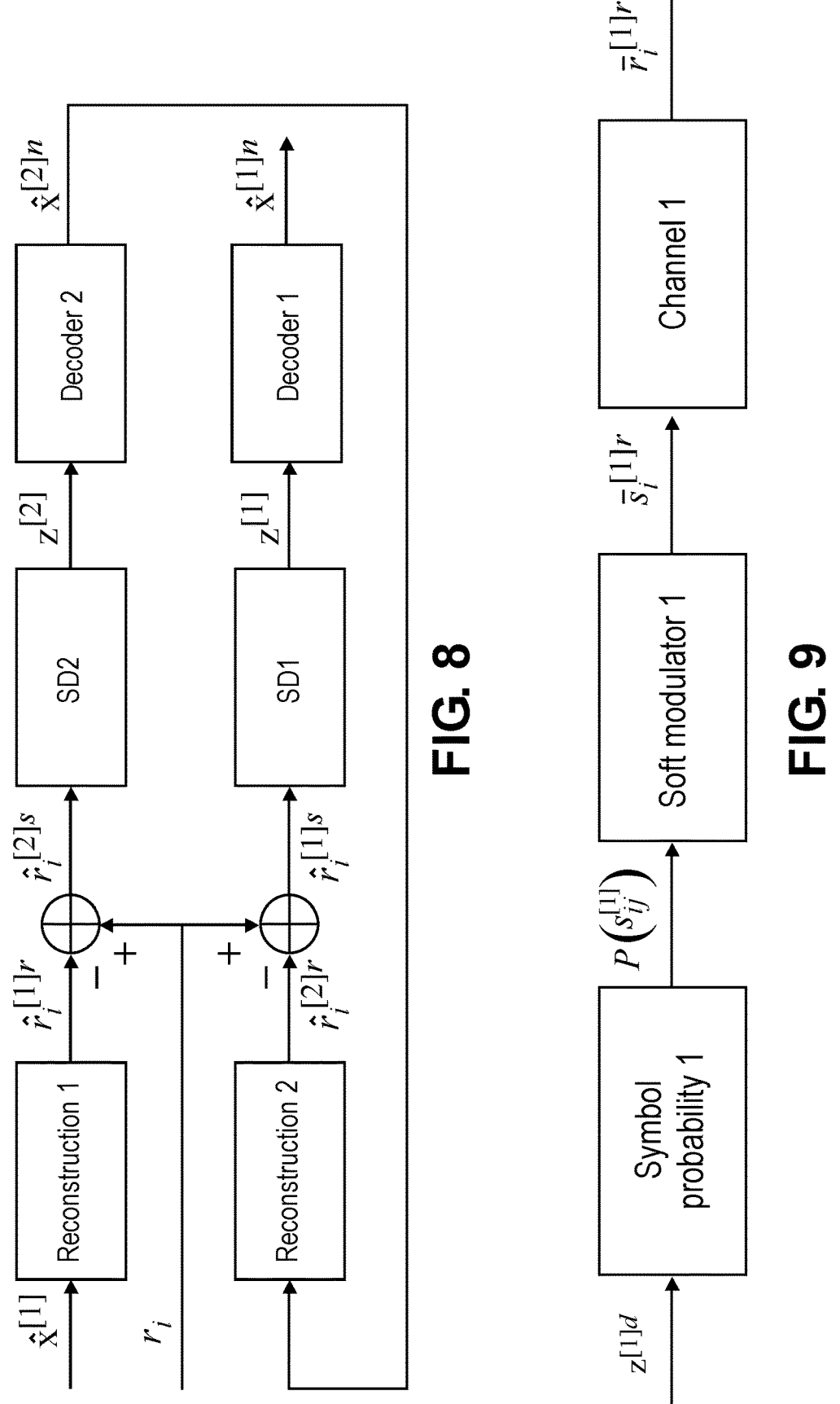
FIG. 8 is a diagram of one example embodiment of a serial multistage receiver.
FIG. 9 is a diagram illustrating soft signal reconstruction.

FIG. 8 is a diagram of one example embodiment of a serial multistage receiver. FIG. 8 shows a single stage of the serial structure. Unlike the parallel stage, this serial stage operates on data corresponding to one of the transmitters at a time. This stage starts with $\hat{x}^{[1]}$ from the previous stage. As in the parallel stage, $\hat{x}^{[1]}$ is used to reconstruct $$\hat{r}_i^{[1]r}$$

and subtract it from $r_i$ to produce $$\hat{r}_i^{[2]s}.$$

The latter is fed to SD2 with covariance $R_v$ (reflecting the removal of interference TX1), to produce a new soft value vector $z^{[2]}$. From this point on, the serial stage is different from the parallel stage.

As illustrated in FIG. 8, in the absence of a new $z^{[1]}$, $z^{[2]}$ is input to the dedicated decoder for $y^{[2]}$ (or equivalently replace $z^{[1]}$ with zeros and use the mother decoder as discussed herein above). The output is a new $\hat{x}^{[2]n}$, which is used to reconstruct $$\hat{r}_i^{[2]r}$$

and subtract it from $r_i$ to produce $$\hat{r}_i^{[1]s}.$$

The latter is fed to SD1 with covariance $R_v$ (reflecting the removal of interference TX2), to produce a new soft value vector $z^{[1]}$. Finally, $z^{[1]}$ is input to decoder 1, the dedicated decoder for $y^{[1]}$ (or equivalently replace $z^{[2]}$ with zeros and use the mother decoder as discussed earlier). The output is a new $\hat{x}^{[1]n}$. Subsequent stages follow in the same manner as other embodiments. That is, the output $\hat{x}^{[1]n}$ from stage 2 becomes the input $\hat{x}^{[1]}$ for stage 3, which produces a new output $\hat{x}^{[1]n}$, and similarly follows the other embodiments. The stopping criterion may be that the parity bits of $\hat{x}^n$ (made up of $\hat{x}^{[1]n}$ and $\hat{x}^{[2]n}$) check successfully, or that the solution does not change from stage to stage.

The first stage of the serial structure is slightly different than subsequent stages. In the absence of an initial input $\hat{x}^{[1]}$, the reconstructed signal $$\hat{r}_i^{[1]r}$$

is set to zero (or equivalently the process removes the reconstruction and subtraction). In effect $r_i$ is input directly to SD2, so the noise covariance should be $$R_w^{[2]}.$$

The rest of the first stage is unchanged from the other embodiments.

In the serial structure stage, it is important to avoid unwanted biases. Specifically, since $\hat{x}^{[1]}$ was the result of the old $z^{[1]}$ in the previous stage, and is used to produce the new $z^{[2]}$, the process does not use the old $z^{[1]}$ in the decoder (decoder 2 in FIG. 8) along with the new $z^{[2]}$. Also, since $\hat{x}^{[2]n}$ is the result of the new $z^{[2]}$, the process does not use the new $z^{[2]}$ in the decoder (i.e., the decoder 1 in FIG. 8) along with the new $z^{[1]}$.

The embodiments can use one of the quality measures described earlier to choose the stronger signal to subtract first. It may also be beneficial to alternate the order of $\hat{x}^{[1]}$ or $\hat{x}^{[2]}$ some stages, or to randomize their order.

In some embodiments, a soft signal reconstruction is utilized. The embodiments can take advantage of a decoder's ability to produce output soft values for the coded bit to perform a soft reconstruction. Specifically, the decoder outputs soft values for the coded bits, which can be understood as an enhancement over the coded bit soft values at the decoder input. These soft values are denoted as $z^{[1]d}$ and $z^{[2]d}$. These soft values can be denoted in a soft reconstruction of modulation symbols. One intermediate step of the process is to turn soft values into probabilities. The embodiments assume that a soft value is a log likelihood ratio. For some bit $$y_k^{[1]}$$

from TX1, the probability can be represented as $$P\left(y_k^{[1]} = 0\right) = \frac{e^{z_k^{[1]d}}}{1 + e^{z_k^{[1]d}}}$$

Next the process forms the symbol probability from the bit probability. The $P_1$ bits $$\left(y_{k_1}^{[1]}, \ldots, y_{k_{P_1}}^{[1]}\right)$$

map into symbol j of $$s_i^{[1]},$$

denoted $$s_{ij}^{[1]}, 1 \le j \le N_{TX1}.$$

Then the estimate of the probability of $$s_{ij}^{[1]}$$

is given by the product $$P\left(s_{ij}^{[1]}\right) = P\left(y_{k_1}^{[1]}\right) \ldots P\left(y_{k_{P_1}}^{[1]}\right)$$

Next the process can find the soft reconstructed symbol $$\bar{s}_{ij}^{[1]r}$$

as the expected value $$\bar{s}_{ij}^{[1]r} = \sum_{\check{s}} P\left(s_{ij}^{[1]} = \check{s}\right)\check{s}$$

Where the sum is over all $2^{P_1}$ symbols $\check{s}$ in the modulation constellation of TX1. The soft reconstructed vector $$\bar{s}_i^{[1]r}$$

consists of the entries $$\bar{s}_{ij}^{[1]r}.$$

Finally, the channel can be applied to get $$\bar{r}_i^{[1]r} = H_i^{[1]} \bar{s}_i^{[1]r}$$

The process is shown in FIG. 9, and is refer to as soft reconstruction, to distinguish it from hard reconstruction. Similarly, the same steps can be followed to produce $$\bar{r}_i^{[2]r}$$

fom $z^{[2]d}$.

A parallel multi-stage receiver can incorporate soft reconstruction into the stage of the parallel receiver structure. Referring back to FIG. 7, the input $\hat{x}^{[1]}$ is replaced by $z^{[1]d}$ and the output of reconstruction 1 is now $$\bar{r}_i^{[1]r}.$$

Similarly the input $\hat{x}^{[2]}$ is replaced by $z^{[2]d}$ and the output of reconstruction 2 is now $$\bar{r}_i^{[2]r}.$$

The decoder outputs $z^{dn}$ (for new), which composed of $z^{[1]dn}$ and $z^{[2]dn}$, the inputs for the next stage.

Similarly, serial multi-stage receiver can incorporate into the stage of the serial receiver structure. Referring back to FIG. 8, the input $\hat{x}^{[1]}$ is replaced by $z^{[1]d}$ and the output of reconstruction 1 is now $$r_i^{[1]r}.$$

Decoder 2 outputs $z^{[2]dn}$ to feed reconstruction 2, whose output is $$r_i^{[2]r}.$$

Decoder 1 outputs $z^{[1]dn}$ for the next stage.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
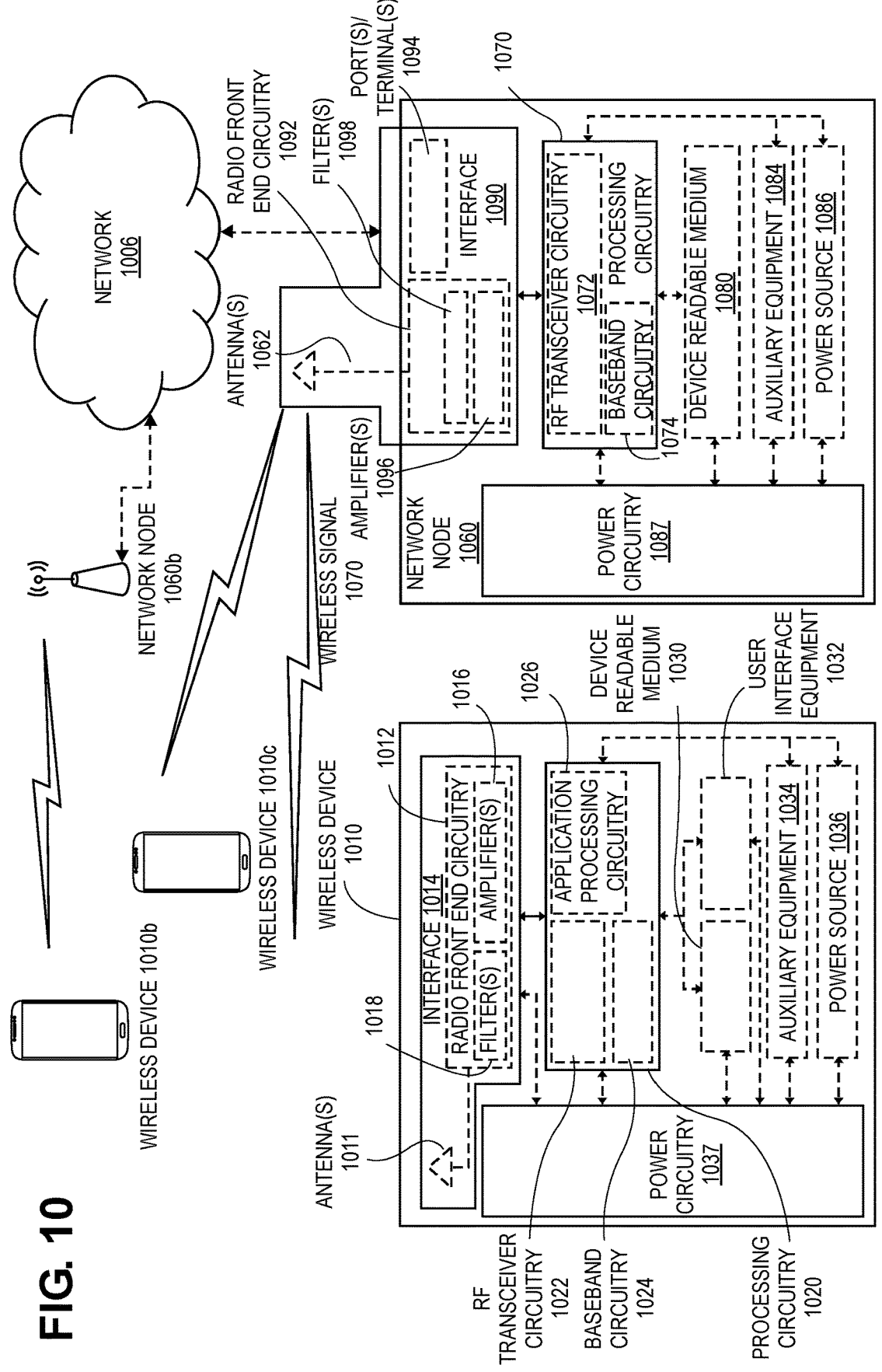
FIG. 10 is a diagram of a wireless network in accordance with some embodiments.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
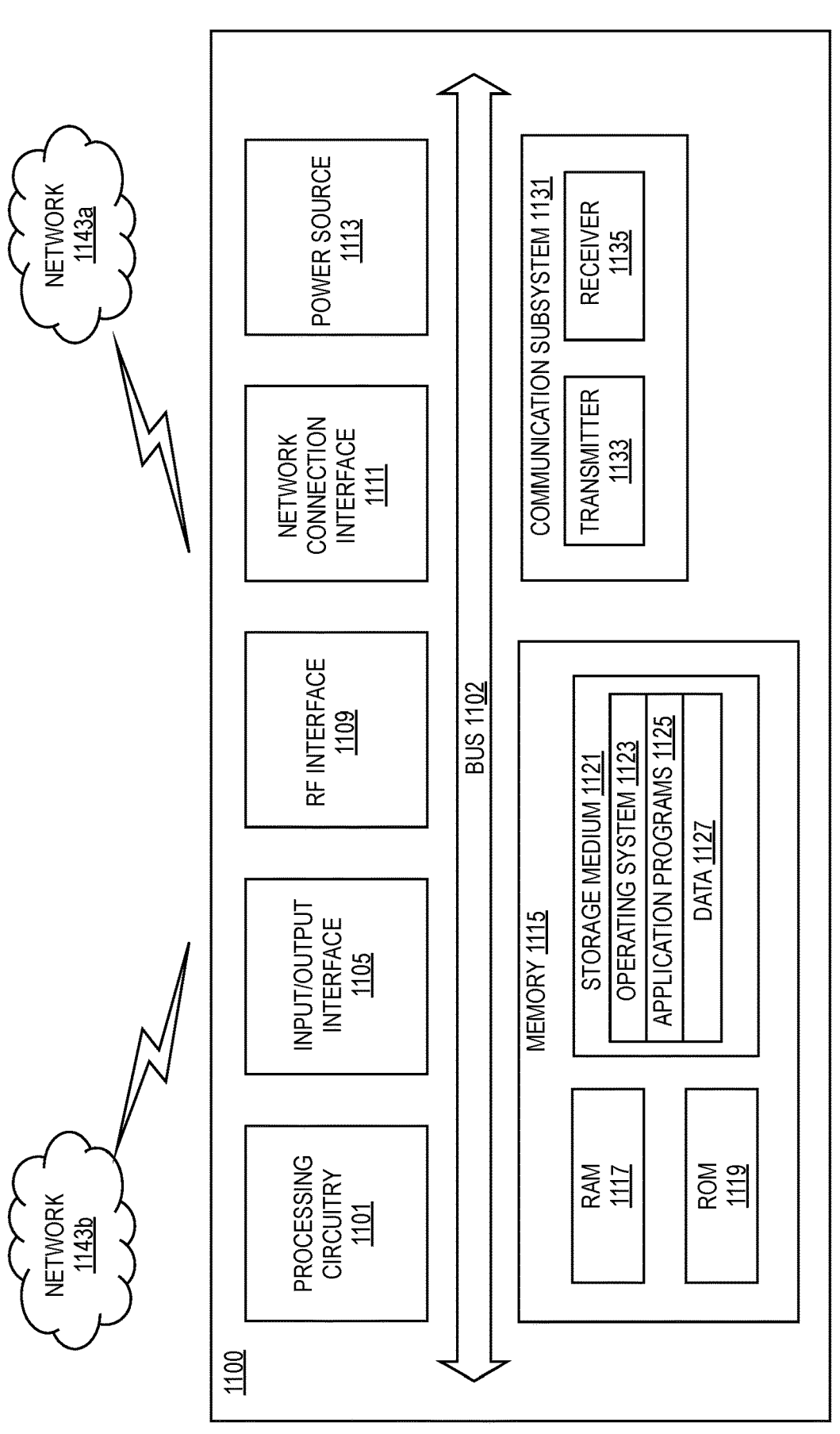
FIG. 11 is a diagram of user equipment in accordance with some embodiments.

FIG. 11: User Equipment in Accordance with Some Embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
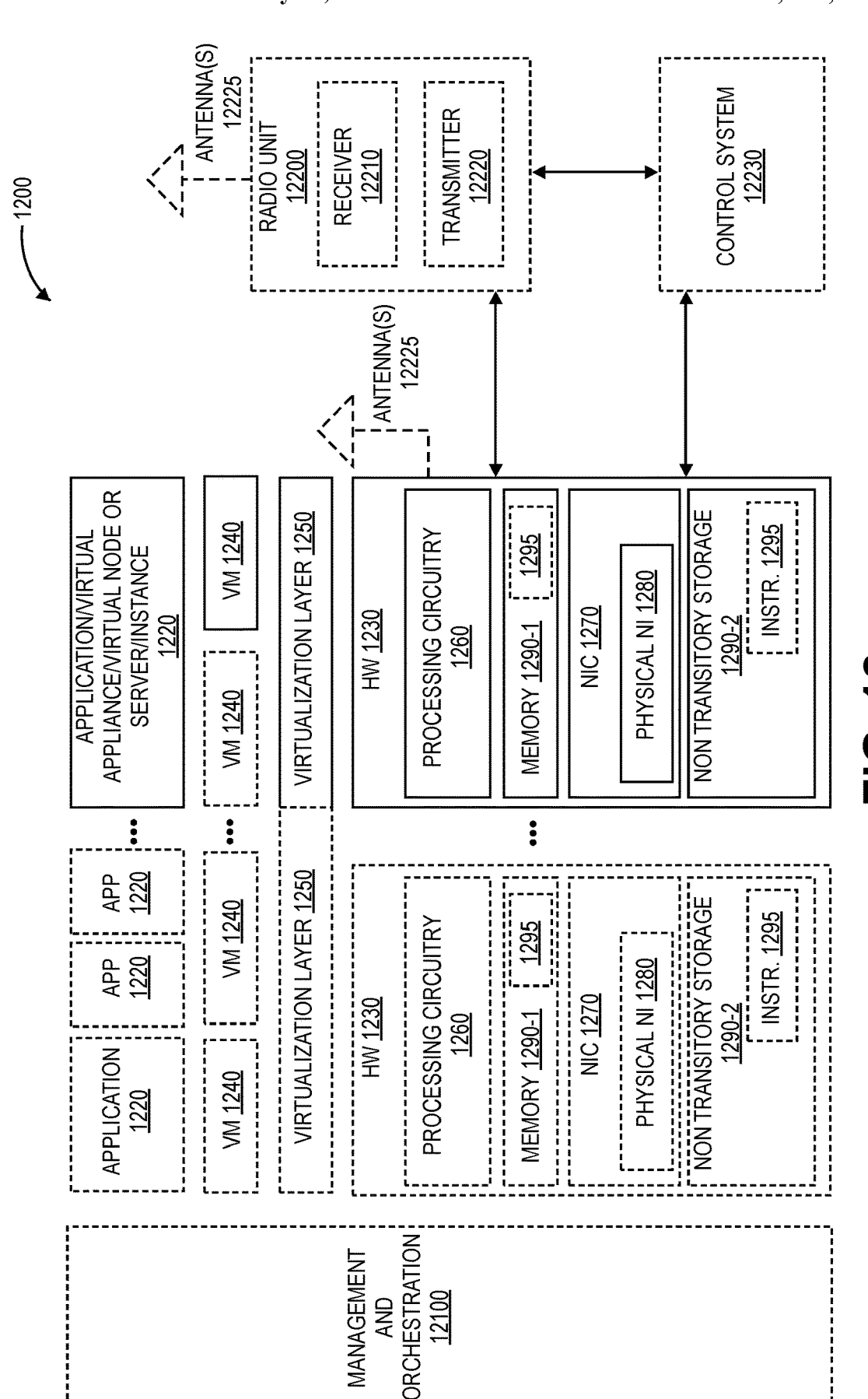
FIG. 12 is a diagram of a virtualization environment in accordance with some embodiments.

FIG. 12: Virtualization Environment in Accordance with Some Embodiments

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
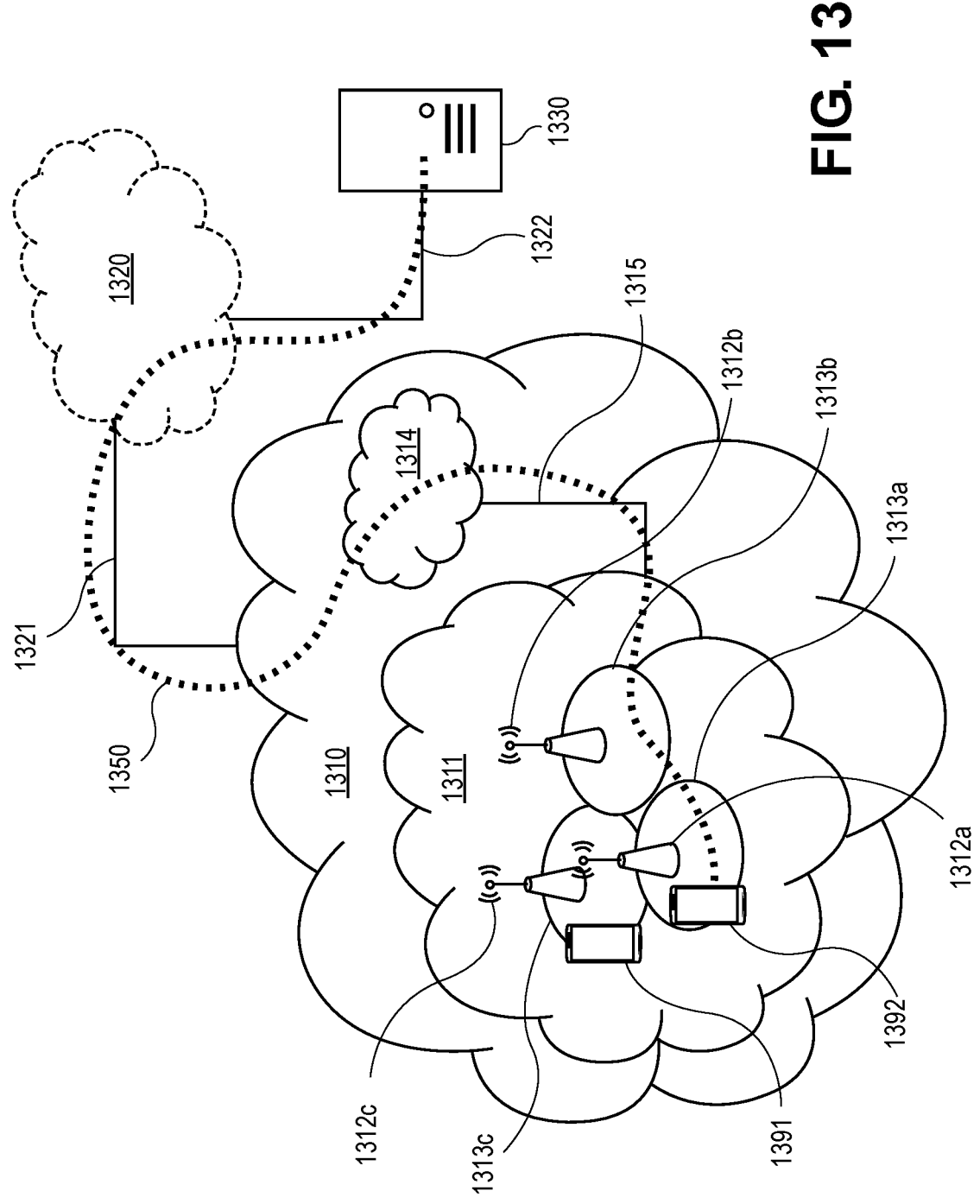
FIG. 13 is a diagram of a telecommunication network connected via an intermediate network to a host computer in accordance with some embodiments.

FIG. 13: Telecommunication Network Connected Via an Intermediate Network to a Host Computer in Accordance with Some Embodiments With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a receiver to enable multi-site wireless transmission using complementary channel coding, the method comprising:

receiving a signal that is a combination of at least a first transmitted signal from a first transmitter and a second transmitted signal from a second transmitter;

processing the signal to produce a first symbol set and a first set of soft values corresponding to the first transmitted signal;

processing the signal to produce a second symbol set and a second set of soft values corresponding to the second transmitted signal;

combining the first set of soft values and the second set of soft values to generate a codeword;

decoding the codeword with a mother code to generate a message;

transforming a representation of the signal into a transmit domain by using a matrix transformation that represents a left inverse of a channel from the first transmitter, which incorporates the channel from the first transmitter and a first noise covariance including an effect of the second transmitted signal; and transforming a representation of the signal into a transmit domain by using a matrix transformation that represents a left inverse of a channel from the second transmitter, which incorporates the channel from the second transmitter and a second noise covariance including an effect of the first transmitted signal.

2. The method of claim 1, further comprising:

sending signal quality information for the first and second transmitted signals to at least one of the first and second transmitters to facilitate matching of signal quality at the first and second transmitters.

3. The method of claim 2, wherein the signal quality information for the first and second transmitted signals includes or is based on a coded bit error rate of a first complementary codeword and a second complementary codeword calculated at the receiver.

4. The method of claim 2, wherein the signal quality information for the first and second transmitted signals includes or is based on magnitudes of the soft values in the first and second sets of soft values.

5. The method of claim 2, wherein the signal quality information for the first and second transmitted signals includes or is based on signal to noise ratio estimates of the soft values in the first and second sets of soft values.

6. An electronic device to implement a method to enable multi-site wireless transmission using complementary channel coding, the electronic device comprising:

a receiver to receive a signal that is a combination of at least a first transmitted signal from a first transmitter and a second transmitted signal from a second transmitter, to process the signal to produce a first symbol set and a first set of soft values corresponding to the first transmitted signal, and to process the signal to produce a second symbol set and a second set of soft values corresponding to the second transmitted signal; and a demodulator coupled to the receiver to combine the first set of soft values and the second set of soft values to generate a codeword, and to decode the codeword with a mother code to generate a message, the demodulator further to transform a representation of the signal into a transmit domain by using a matrix transformation that represents a left inverse of a channel from the first transmitter, which incorporates the channel from the first transmitter and a first noise covariance including an effect of the second transmitted signal, and to transform a representation of the signal into a transmit domain by using a matrix transformation that represents a left inverse of a channel from the second transmitter, which incorporates the channel from the second transmitter and a second noise covariance including an effect of the first transmitted signal.

7. The electronic device of claim 6, wherein the receiver to send signal quality information for the first and second transmitted signals to at least one of the first and second transmitters to facilitate matching of signal quality at the first and second transmitters.

8. The electronic device of claim 7, wherein the signal quality information for the first and second transmitted signals includes or is based on a coded bit error rate of a first complementary codeword and a second complementary codeword calculated at the receiver.

9. The electronic device of claim 7, wherein the signal quality information for the first and second transmitted signals includes or is based on magnitudes of the soft values in the first and second sets of soft values.

10. The electronic device of claim 7, wherein the signal quality information for the first and second transmitted signals includes or is based on signal to noise ratio estimates of the soft values in the first and second sets of soft values.

* * * * *